(12) United States Patent
Loreto et al.

(10) Patent No.: US 11,995,596 B2
(45) Date of Patent: May 28, 2024

(54) SYSTEM, METHOD, AND COMPUTER-READABLE MEDIUM FOR TRACKING INFORMATION EXCHANGE

(71) Applicants: SONY CORPORATION, Tokyo (JP); Complexity Science Hub Vienna, Vienna (AT)

(72) Inventors: Vittorio Loreto, Stuttgart (DE); Vito D. P. Servedio, Vienna (AT); Niklas Reisz, Vienna (AT); Stefan Thurner, Vienna (AT)

(73) Assignees: SONY CORPORATION, Tokyo (JP); COMPLEXITY SCIENCE HUB VIENNA, Vienna (AT)

( * ) Notice: Subject to any disclaimer, the term of this patent is extended or adjusted under 35 U.S.C. 154(b) by 478 days.

(21) Appl. No.: 16/375,017

(22) Filed: Apr. 4, 2019

(65) Prior Publication Data
US 2020/0320458 A1     Oct. 8, 2020

(51) Int. Cl.
*G06Q 10/0639* (2023.01)
*G06F 16/23* (2019.01)
*G06Q 10/101* (2023.01)
*G06Q 20/36* (2012.01)
(Continued)

(52) U.S. Cl.
CPC ... *G06Q 10/06398* (2013.01); *G06F 16/2365* (2019.01); *G06F 16/2379* (2019.01); *G06Q 10/101* (2013.01); *G06Q 20/363* (2013.01); *H04L 63/102* (2013.01); *G06Q 50/01* (2013.01)

(58) Field of Classification Search
CPC .......... G06Q 10/06398; G06Q 10/101; G06Q 20/389; G06Q 2220/00; G06Q 20/363; G06Q 50/01; G06Q 20/02; G06Q 20/102; G06Q 20/384; G06Q 10/06313; G06Q 20/10; G06Q 30/0279; G06Q 40/00; G06Q 20/145; G06F 16/2379; G06F 3/048; G06F 16/2365; G06F 16/9024; H04L 2209/38; H04L 63/12; H04L 9/3239;
(Continued)

(56) References Cited

U.S. PATENT DOCUMENTS 10,600,009 B1 * 3/2020 Augustine ............. H04L 9/3213
2013/0173714 A1   7/2013 D Amore
(Continued)

FOREIGN PATENT DOCUMENTS

CN    108984311 A    12/2018
JP    2004310193 A   11/2004
(Continued)

*Primary Examiner* — Michael Jared Walker
*Assistant Examiner* — Avia Salman
(74) *Attorney, Agent, or Firm* — XSENSUS LLP

(57) ABSTRACT

An information exchange tracking system includes a server including processing circuitry configured to track an information exchange transaction, identify contributors in the information exchange transaction, determine a level of contribution of each contributor, the level of contribution being secured by a blockchain, and award each contributor based on their level of contribution. Accordingly, collaborative processes of co-creation are securely recorded using the blockchain and can be used to monitor the collective dynamics of the whole creative process while giving proper credits to all the relevant actors according to their specific contributions.

18 Claims, 13 Drawing Sheets

(51) Int. Cl.
*G06Q 50/00* (2012.01)
*H04L 9/40* (2022.01)

(58) Field of Classification Search
CPC . H04L 2209/56; H04L 63/102; H04L 9/0637; H04L 9/50; A63F 13/63; A63F 13/69
See application file for complete search history.

(56) References Cited

U.S. PATENT DOCUMENTS

| | | | | |
|---|---|---|---|---|
| 2015/0262171 | A1* | 9/2015 | Langschaedel | G06Q 20/384 |
| | | | | 705/71 |
| 2015/0347971 | A1* | 12/2015 | D'Amore | G06Q 10/101 |
| | | | | 705/300 |
| 2018/0158051 | A1* | 6/2018 | Arora | G06Q 20/401 |
| 2018/0315055 | A1* | 11/2018 | Pickover | H04L 9/3297 |
| 2019/0013931 | A1* | 1/2019 | Benini | H04L 9/006 |
| 2019/0122152 | A1* | 4/2019 | McCoy | G06F 8/71 |

FOREIGN PATENT DOCUMENTS

| | | |
|---|---|---|
| JP | 2017215943 A | 12/2017 |
| WO | WO-2018226740 A2 | 12/2018 |

* cited by examiner

SYSTEM, METHOD, AND COMPUTER-READABLE MEDIUM FOR TRACKING INFORMATION EXCHANGE

BACKGROUND

Exchanges of information often go untraced. For example, consider all informal interactions, formal meetings, and brainstorming sessions in which no digital monitoring is in place and the actual information content transferred is very difficult to grasp. Accordingly, the outcome of an industrial, creative, or scientific project is often the result of the combined efforts of its contributors whose effective contributions cannot be easily assessed. To further complicate things, due to the ubiquitous reachability of the world wide web, many actors may contribute remotely to building complex projects including methods to manufacture physical goods that can be sold in the global market, creating intangible goods like songs or computer programs, authoring scientific publications, and the like. While these projects are in progress, contributions can get lost or attributed incorrectly, and even when the contributions get attributed to the correct contributors, distribution of rewards often does not correspond to the contributed value.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, an information exchange tracking system includes a server including processing circuitry configured to track an information exchange transaction, identify contributors in the information exchange transaction, determine a level of contribution of each contributor, the level of contribution being verified via a blockchain, and award each contributor based on their level of contribution. Accordingly, collaborative processes of co-creation are securely recorded using the blockchain and can be used to monitor the collective dynamics of the whole creative process while giving proper credits to all the relevant actors according to their specific contributions.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
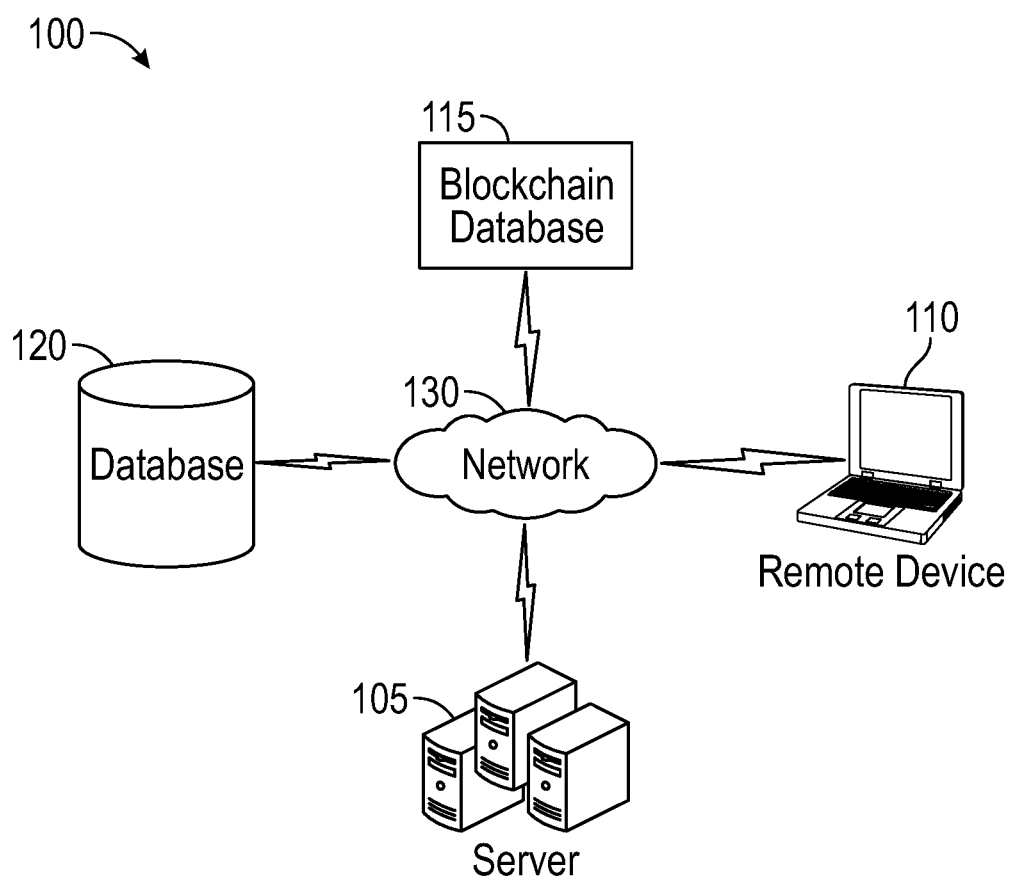
FIG. 1 illustrates an exemplary information exchange tracking system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the"

include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 illustrates an exemplary information exchange tracking system 100 (herein referred to as the system 100) according to one or more aspects of the disclosed subject matter. The system 100 can include a server 105, a remote device 110, a blockchain database 115, a database 120, and a network 130.

The server 105 can represent one or more servers communicably coupled to the remote device 110, the blockchain database 115, and the database 120 via the network 130. The server 105 can be configured to perform various processing for the system 100 as further described herein. Additionally, the server 105 can represent a dedicated bank of servers, cloud-based processing, and/or a serverless computing system corresponding to a virtualized set of hardware resources.

The remote device 110 can represent one or more remote devices communicably coupled to the server 105, the blockchain database 115, and the database 120 via the network 130. The remote device 110 can be a computer, laptop, smartphone, tablet, PDA, and the like. The remote device 110 can be operated by a user to interact with the system 100 as further described herein. For example, any remote device 110 can be used to connect to the system 100 through a web app and/or while using a software tool that communicates with the system 100 via an API.

The blockchain database 115 can be communicably coupled to the server 105, the remote device 110, and the database 120 via the network 130. The blockchain database 115 can be configured to store information corresponding to user activities and interactions in an immutable ledger as further described herein. A blockchain is an immutable, cryptographically secured, distributed database. Accordingly, blockchain and blockchain database may be used interchangeably herein. In one example of a blockchain, a blockchain stores information in uniform sized blocks. Each block contains the hashed information from the previous block to provide cryptographic security. The hashing can be SHA256, for example, which is a one-way hash function. This hashed information is the data and digital signature from the previous block, and the hashes of previous blocks that goes all the way back to the very first block produced in the blockchain called a "genesis block". That information is run through a hash function that then points to the address of the next block. Once the block has been added to the blockchain, the information is immutable and transparent to all. Alternatively, or additionally, a blockchain can be operated in a private or permissioned environment, such as within a company. It should be appreciated that the blockchain is described as "immutable" because, despite a scenario where it's possible to alter content of the blockchain in theory, making retrospective changes to the blockchain requires very significant amounts of computing power and is thus in most cases impossible and certainly unfeasible. Accordingly, because it is practically unfeasible, the blockchain is referred to herein as immutable.

The database 120 can represent one or more database communicably coupled to the server 105, the remote device 110, and the blockchain database 115 via the network 130. The database 120 can be configured to store information for the system 100 as further described herein. For example, the database 120 can store user interactions captured via the remote device 110 for fast data access and analytics. Additionally, the interactions stored via the database 120 can be appended to the blockchain (e.g., via the blockchain database 115) in parallel, as further described herein.

The network 130 can be a public network, such as the Internet, or a private network, such as an LAN or WAN network, or any combination thereof and can also include PSTN or ISDN sub-networks. The network 130 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Generally, the system 100 can assess and quantify all the individual contributions to a shared project in a trusted way.

More specifically, the system 100 can be a combined system including a web application with a user interface that can be accessed and interacted with via the remote device 110, for example. The web application can be communicably coupled to a blockchain database (e.g., the blockchain database 115) which will allow users to store their contributions in a distributed and immutable way. The user interface can allow tracking of both physical (i.e., in person) and virtual (i.e., via the web) interactions of one or more users. The web application can record user activities and interactions. And, the blockchain database 115 can receive the information corresponding to all the interactions and store them in an immutable ledger, guaranteeing immutability and trust.

The contributions can be both concrete or intangible (e.g., knowledge transfer processes including all the processes where people exchange information, knowledge, know-how or concrete intellectual outcomes). As a result, collaborative processes of co-creation are recorded and can be used to monitor the collective dynamics of the whole creative process while giving proper credits to all the relevant actors according to their specific contributions.

For example, the system 100 can record the flow of information in a collaborative scientific environment using a web application connected to a blockchain. With the web application, users (e.g., collaborators in the scientific environment) can interact with each other by creating and scanning QR codes on the smart phones and/or sending URLs. The different types of interactions that can be recorded can include peer to peer (e.g., discussions, emails, etc.), one to many (e.g., lecture, book, paper, etc.), many to many (e.g., group meetings, etc.), projects (e.g., ongoing collaborations), and the like. After a user creates a QR code for an interaction (e.g., lecturer), the recipients of the information (e.g., audience attending the lecture) can scan the QR code to initiate a transaction. Each transaction can be annotated, and the recipient of the information can be awarded virtual coins, for example. The transaction can be stored redundantly in a conventional database (e.g., the database 120 (e.g., a SQL database)) and in a blockchain (e.g., the blockchain database 115). The blockchain can be distributed and public or used as a permissioned blockchain inside a company or research group. The exchange of virtual currency and the evaluation of each user contribution by the use of a reputation system can be handled by smart contracts on the blockchain, for example.

Figure 8:
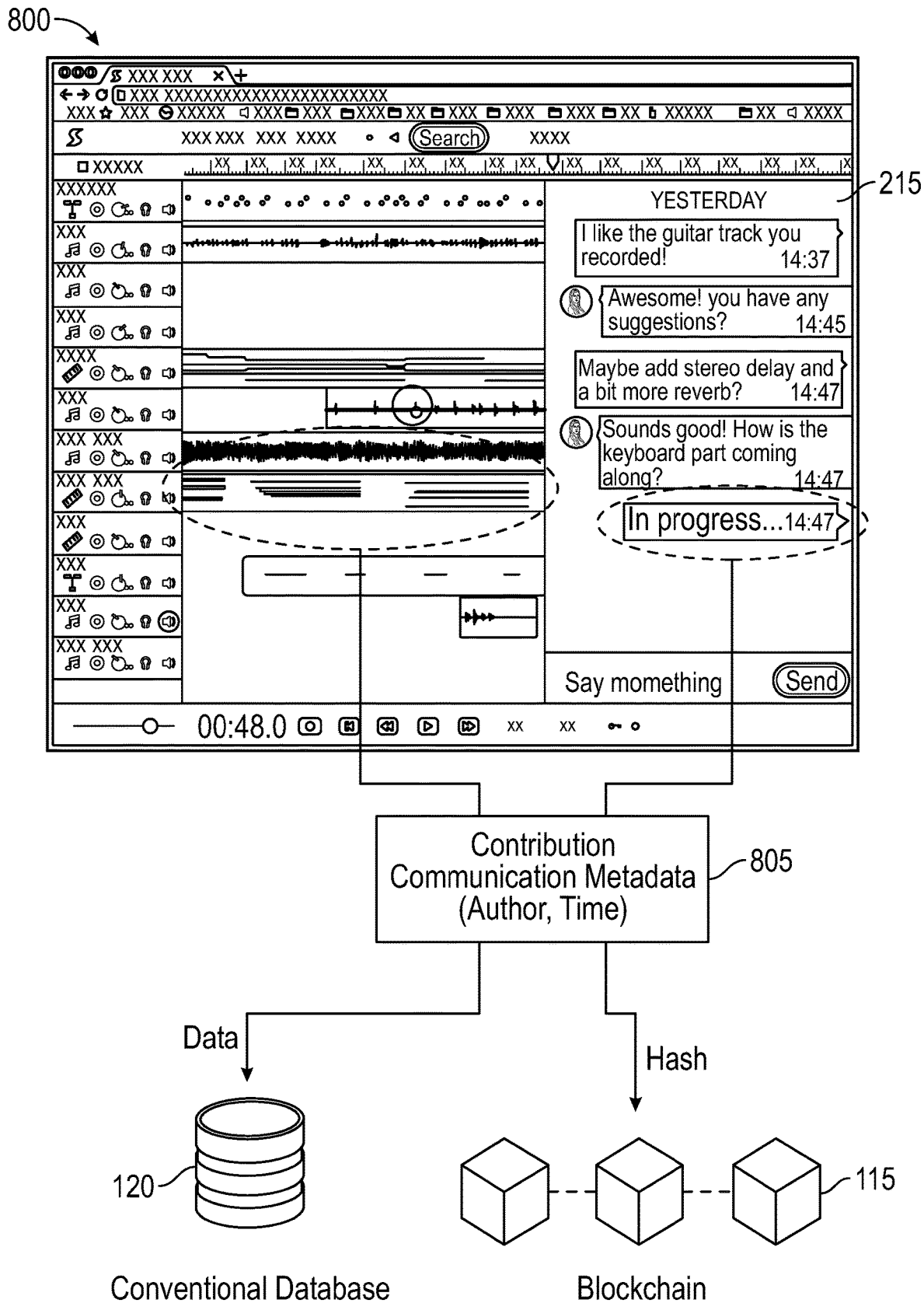
FIG. 8 illustrates an exemplary co-creation process according to one or more aspects of the disclosed subject matter.

In another example, the system 100 can be used for collaborative co-creation in the music industry (e.g., see FIG. 8).

The system 100 includes several advantages including recording the activity of individuals in a distributed and immutable way while providing them with a personal record of activities along with a suitable credit scheme for their contributions. In scientific activities, for example, this can be adopted to build accurate resumes and CVs. In the creative industry, for example, the system 100 can be used to incontrovertibly allow the share of dividends of a final product according to the effective individual workload performed. The system 100 can also be deployed within companies where individual activity of employees is bound to responsibility and reward, for example.

More specifically, the advantages of the system 100 can include assessing the individual efforts of the participants to a project, which can be public, private, scientific, artistic, etc., in order to better quantify rewards; assessing individual responsibilities in collective chain workflow; building individual trusted records of expertise based on real achievements; displaying, visualizing, and statistical processing of personal and global knowledge transfer processes; understanding innovation, knowledge creation, collaboration on both a company and global level in order to boost creative production, and the like.

In other words, knowledge transactions recorded by the system 100 are decentralized and immutable, which means they are fully transparent and cannot be censored or manipulated as ensured by the blockchain. The system 100 benefits individual users by keeping a trusted and immutable record of their individual contributions to work projects. The record can be used as a portfolio to supplement job applications, for example. Further, it aids companies in understanding communication and collaboration dynamics on a deeper level and can be used to understand and improve the catalyzing conditions under which innovations are conceived.

Figure 2:
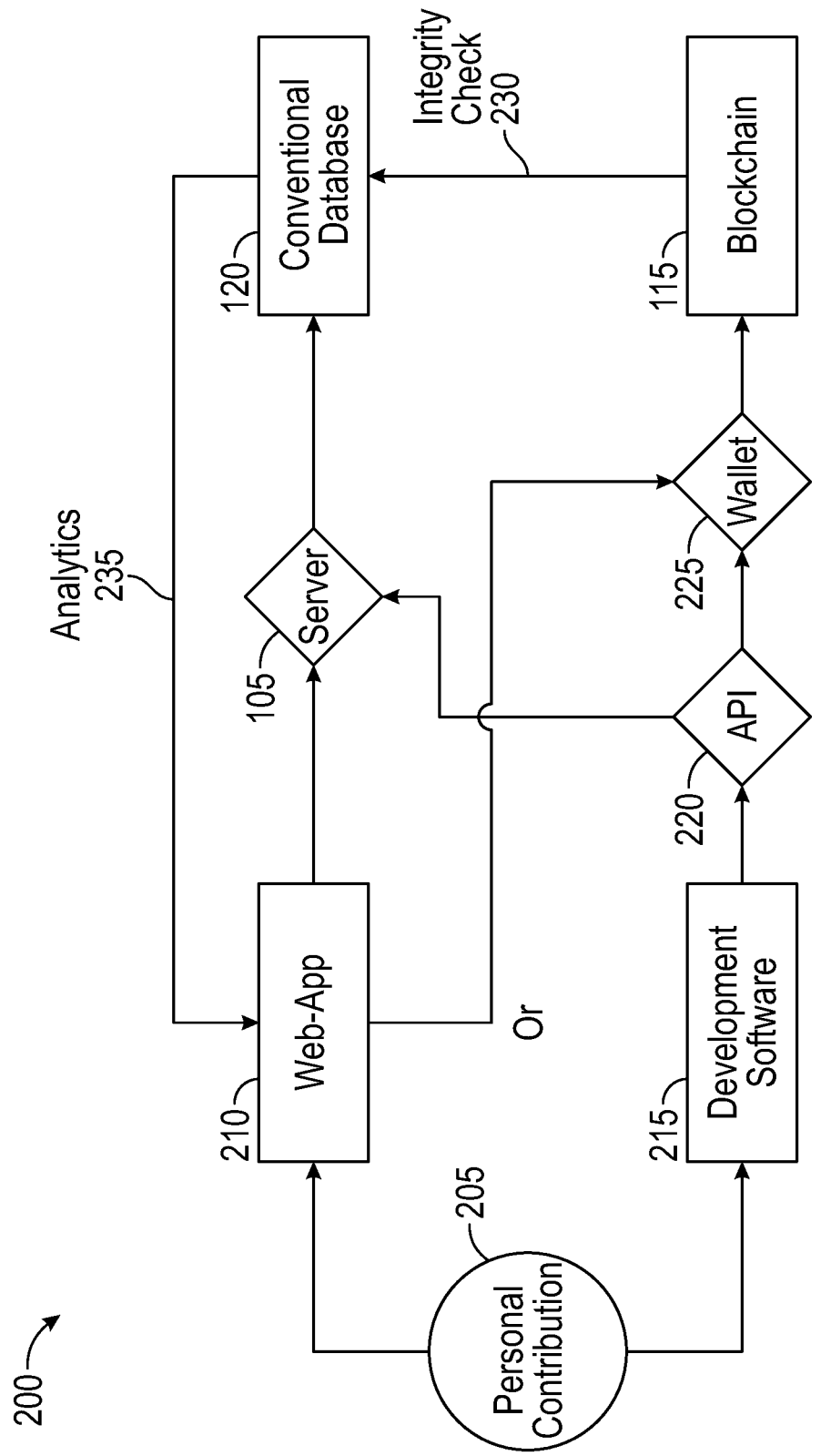
FIG. 2 illustrates an information exchange workflow according to one or more aspects of the disclosed subject matter.

FIG. 2 illustrates an information exchange workflow 200 according to one or more aspects of the disclosed subject matter. Personal contributions 205 can correspond to tracked information exchanges as user input. The personal contributions 205 can come from a web application 210 and/or an existing development software 215 with suitable APIs (e.g., API 220). Once the input is received (e.g., the personal contributions 205 via the web-app 210 and/or development software 215), the contributions can be sent to the server 105. The contributions can then be stored in a conventional database (e.g., the database 120) for fast data access and analytics 235. In parallel, the contributions are appended to the blockchain 115 via a direct access point (e.g., a digital wallet 225). The access point is user controlled and removes the threat of censorship. The blockchain 115 is used to guarantee the integrity and validity (e.g., integrity check 230) of the data stored in the conventional database 120. If a less centralized solution is required, a distributed file storage system (e.g., Inter Planetary File System (IPFS)) can be used, for example, instead of the conventional database 120.

In other words, the workflow 200 illustrates that the system 100 can leverage high levels of security and trust of the blockchain 115. In one embodiment, the blockchain 115 can be the Ethereum blockchain. Each user can access the blockchain 115 from a wallet, effectively eliminating the threat of censorship or fraud. If specific use cases require a more centralized approach, the Hyperledger Fabric blockchain, for example, can be an effective alternative.

Additionally, the web application 210 is intended to be exemplary and it should be appreciated that the web application 210 can also represent a mobile application or a desktop application, for example.

In one embodiment, the system 100 can include AI facilitators that can be in constant dialogue with users (e.g., composers, musicians, writers, scientists, businessmen, etc.) to help them to carve their way in complex landscapes and accompany them through unexplored paths, suggesting new uncommon avenues still close to the sensibility of the creator. Throughout this process, AI systems will constantly construct representations of the space explored adapting them to the emerging space of co-creations.

Additionally, in one embodiment, the system 100 can support suitably conceived credit schemes for users. These schemes will allow the system 100 to provide users with the fair acknowledgement of their contributions as witnessed by the distributed blockchain technology. This has several advantages and represents a paradigmatic shift from a scheme with a lot of unrecognized "ghosts" contributors to a scheme where each contributor will be rewarded according to his/her actual impact to the final product.

Figure 3:
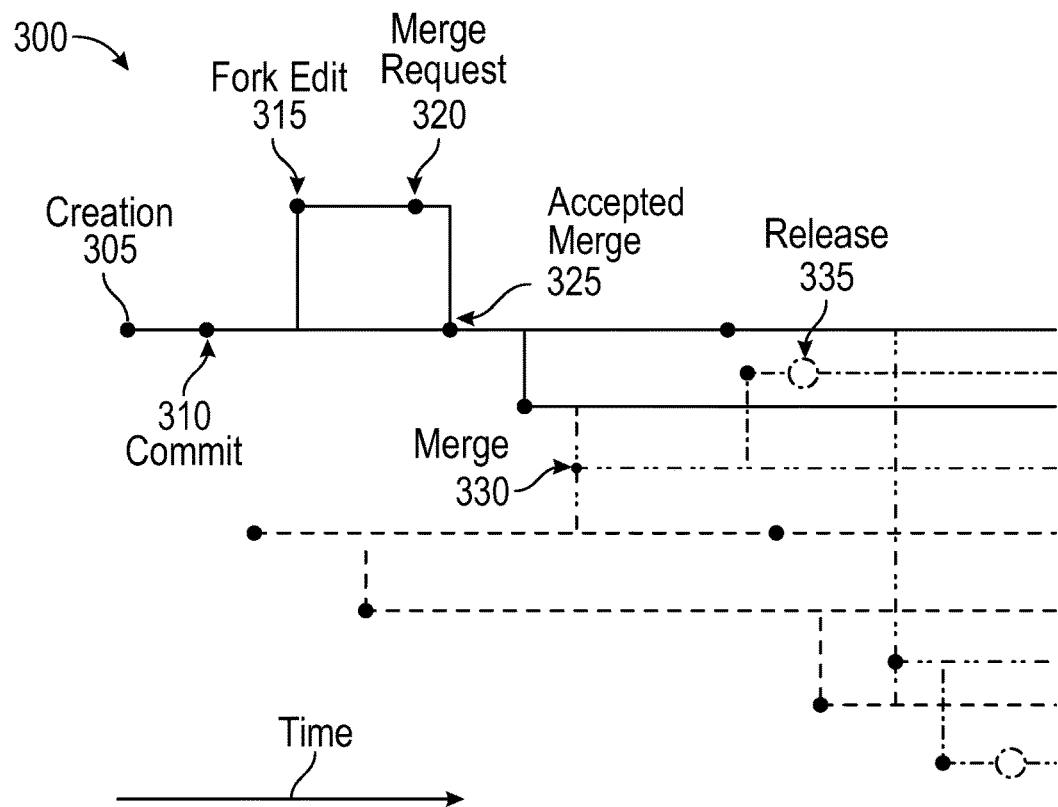
FIG. 3 illustrates a general collaborative process according to one or more aspects of the disclosed subject matter.

FIG. 3 illustrates a general collaborative process 300 as tracked by the system 100 according to one or more aspects of the disclosed subject matter. The collaborative process 300 includes several types of events. For example, creation 305 can correspond to a user creating a new element. Commit 310 can correspond to a user making changes to one of his or her contributions. A fork edit 315 can correspond to a user editing an element of another user which creates a new line of evolution while the old element (the element that the fork edit came from) keeps existing in its own evolutionary line. A merge request 320 can correspond to a user requesting his or her changes to be incorporated back into the original element. An accepted merge 325 can correspond to a merge request 320 being accepted. As a result, the elements are merged by incorporating the changes into the original version, which closes the forked evolutionary line. A merge 330 can correspond to a user merging two elements to create a new element and a new evolutionary line (e.g., music and vocals). And the old elements can still keep evolving along their own evolutionary lines. A release 335 can correspond to an element that is released as a finished product. When a finished product is released, the system 100 can highlight all users who contributed by tracking the specific contributions in the evolutionary lines that led to a final product. A specific example of tracking the evolutionary lines that led to a final product is illustrated in FIG. 4.

Figure 4:
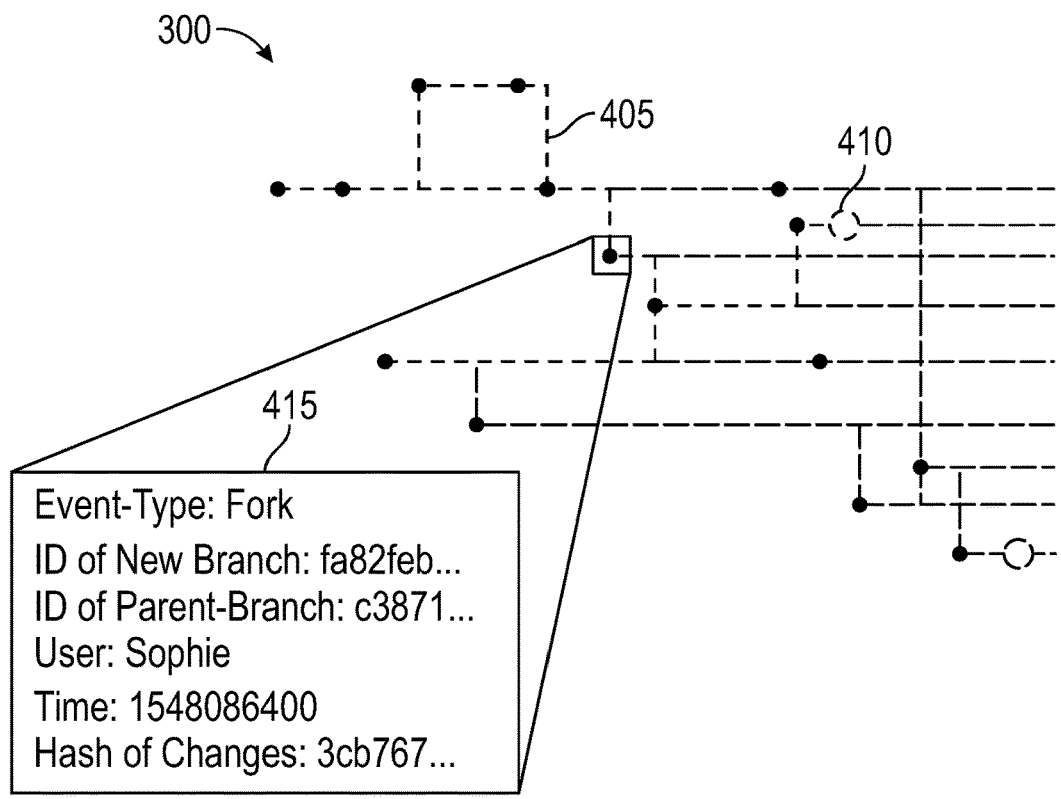
FIG. 4 illustrates an evolutionary line that led to a final product release in the collaborative process according to one or more aspects of the disclosed subject matter.

FIG. 4 illustrates an evolutionary line 405 that led to a final product release 410 in the collaborative process 300 according to one or more aspects of the disclosed subject matter. Additionally, each node of the complex structure is associated with a series of metadata 415 illustrating the type of event responsible for that node, different IDs, the contributing user, the time stamp, the hash of the actual content represented by the node, and the like.

Figure 5A:
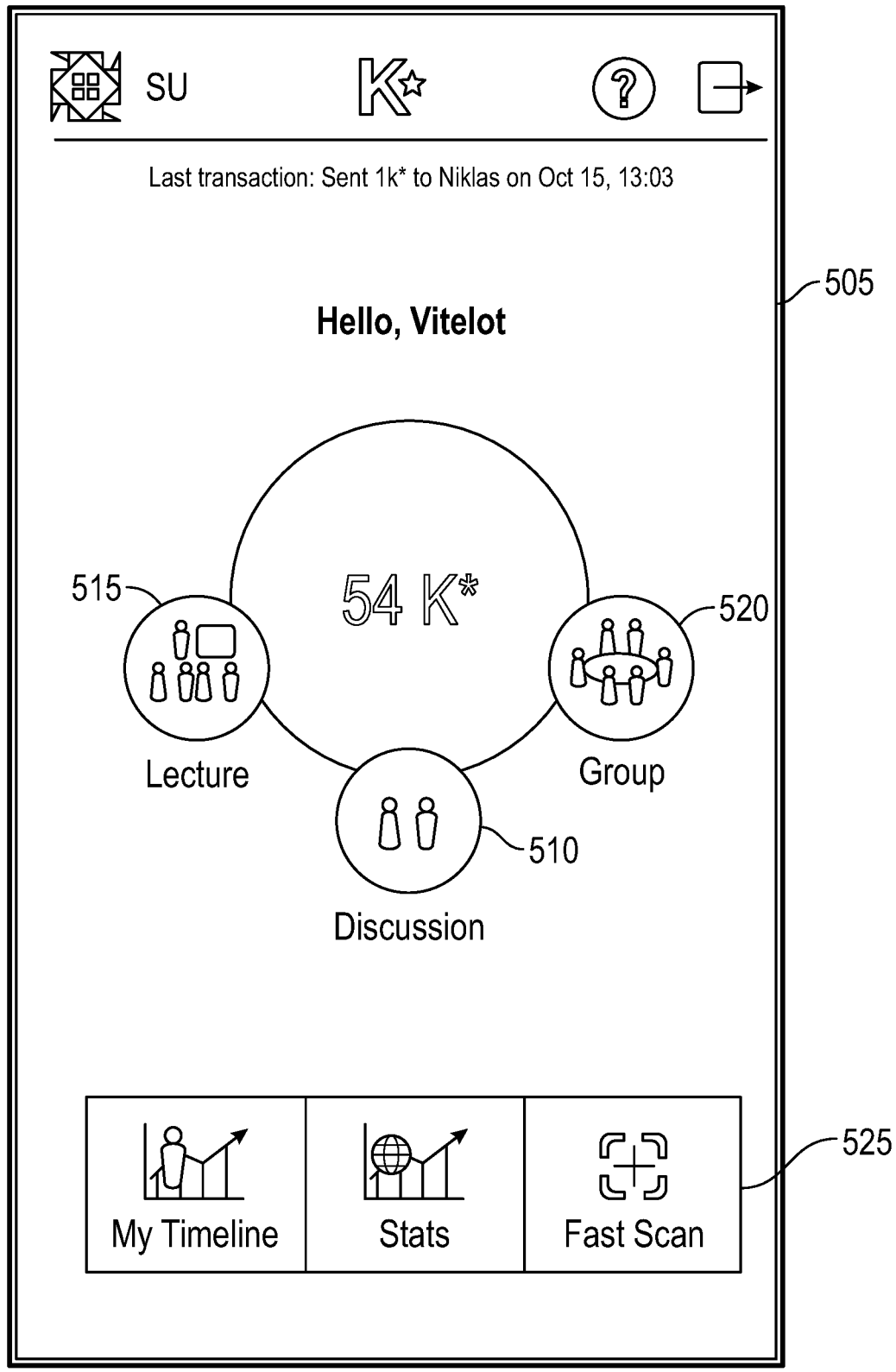
FIG. 5A illustrates an exemplary main page of a user interface of the web application according to one or more aspects of the disclosed subject matter.
Figure 5B:
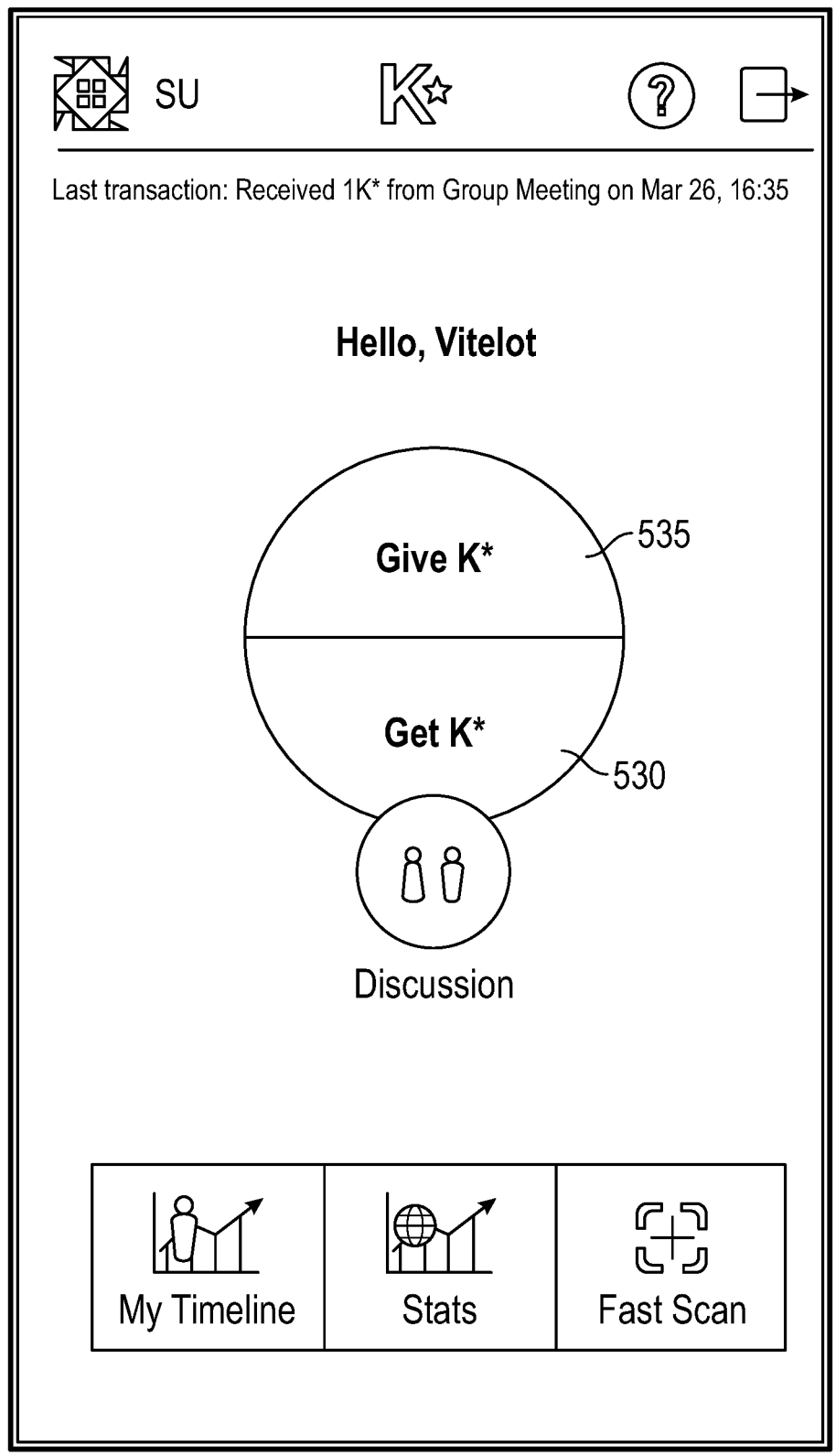
FIG. 5B illustrates an exemplary interface of the web application for a one to one interaction according to one or more aspects of the disclosed subject matter.
Figure 5C:
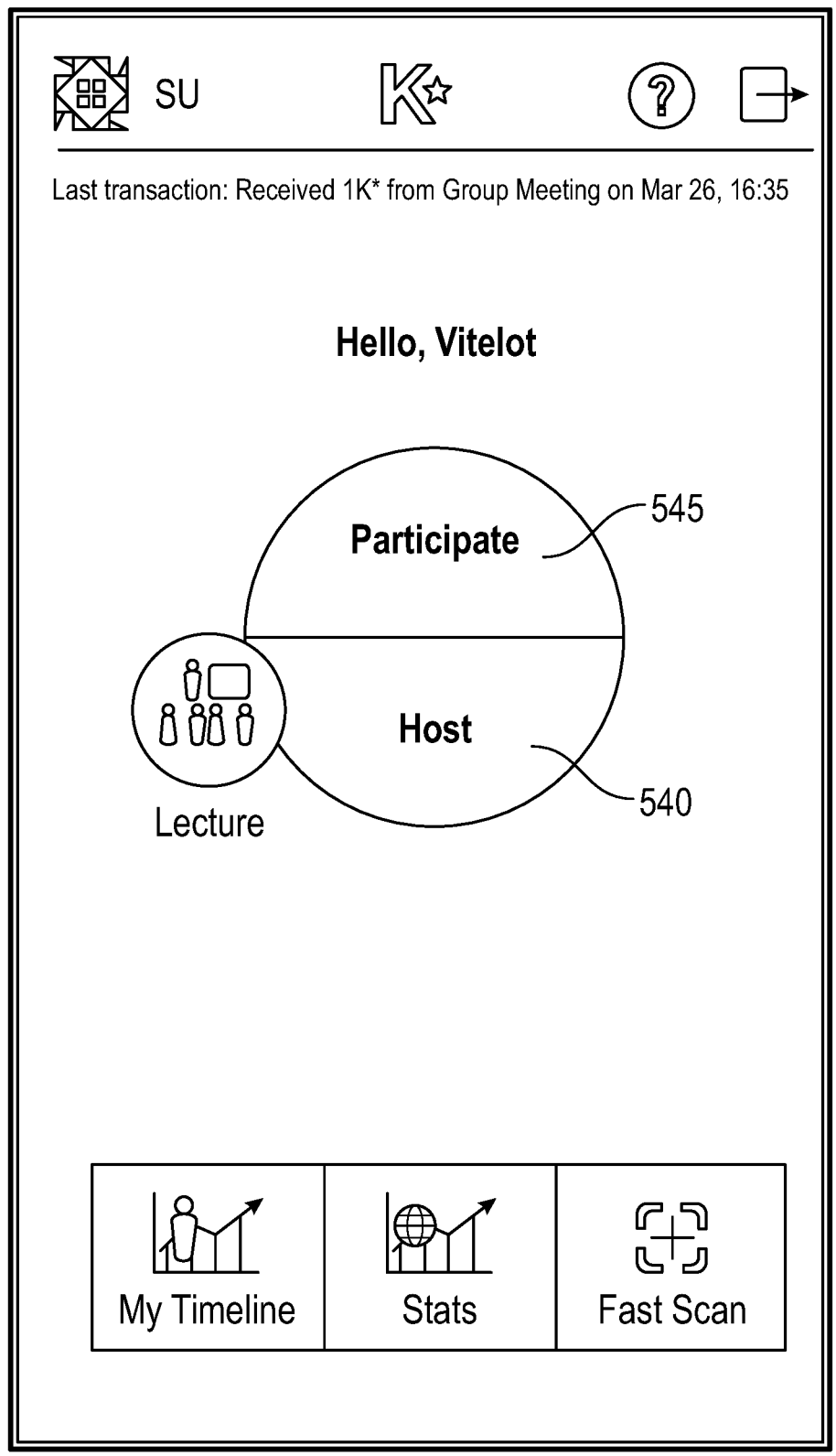
FIG. 5C illustrates an exemplary interface of the web application for a one to many interaction according to one or more aspects of the disclosed subject matter.

FIGS. 5A-5C illustrate exemplary views of a user interface of the web application 210 according to one or more aspects of the disclosed subject matter.

FIG. 5A illustrates an exemplary main page 505 of a user interface of the web application 210 according to one or more aspects of the disclosed subject matter.

FIG. 5B illustrates an exemplary interface of the web application 210 for a one to one interaction according to one or more aspects of the disclosed subject matter.

FIG. 5C illustrates an exemplary interface of the web application 210 for a one to many interaction according to one or more aspects of the disclosed subject matter.

Referring again to FIG. 5A, the web application 210 can be used to record the transfer of knowledge occurring between people. For example, whenever information flows from a user A to a user B, user B sends a virtual coin named K* (pronounced K-star) to user A as a sign of appreciation. Users can interact by generating and scanning a QR code, for example, on their mobile devices and adding a brief description of the information exchange. All activity can be recorded on the blockchain 115 where it is publicly visible. It should be appreciated that the K* virtual currency is exemplary and should not be limiting The web application 210 can capture various types of interactions including one to one interactions, talks, seminars, lectures, group meetings, and the like. The following examples are simply meant to illustrate use of the web application 210 and are not intended to be limiting. For example, in a one to one interaction, a user A can help a user B in solving a problem or just delivers meaningful information to B. Then, user B can send a K* coin to A with the web application 210 and add a comment specifying the type and content of the interaction. To specify the type and content of the interaction, user A can select a Discussion icon 510 on the main page 505 and choose the "get K*" option 530 (see FIG. 5B), for example. User A will generate a QR code containing the details to start the transaction. User B opens the Discussion section as well and chooses a "give K*" option 535 (see FIG. 5B) to activate the optical QR-code scanner. After scanning the QR-code, user B may add a comment to annotate the interaction. The details of the transactions are stored in an internal database (e.g., the database 120) and at the same time are submitted to the blockchain 115 for validation.

For interactions like talks, seminars, and lectures (e.g., one to many interactions), the lecturer has to generate the QR code for the event by pressing the Lecture icon 515 on the main page 505 and then a Host button 540 (see FIG. 5C). The lecturer may also add a description of the event and set a QR expiration time. The description might also include useful details like a link to supplementary material, datasets, etc. Users attending the event would press the Lecture icon 515 from their web application and then a Participate button 545 (see FIG. 5C). After scanning the QR-code, the attendees may add a comment that could be useful for the lecturer (e.g., feedback on the lecture). The lecturer will then receive a K* for each confirmed participant.

For interactions like a group meeting, the aim of the group meeting functionality is to record situations where information is shared equally by two or more users. For example, one of the participants can generate the QR code for the meeting by pressing the Group icon 520 and then a Create button, for example, on a subsequent screen to confirm the creation of the group meeting. A description of the meeting can be added and a QR expiration time can be set. Users participating in the meeting can also press the Group icon 520 on their web application and then a Participate button, for example, to confirm their participation in the group meeting. All users participating will receive a K*. The user who created the QR code will receive a K* as soon as at least another user joins the meeting by confirming the transaction, for example.

Users can scan QR codes directly by interacting with the Fast Scan icon 525, for example. As soon as a QR code is available, users can scan it directly without clicking the icons for Discussion 510, Lecture 515, or Group Meetings 520. In other words, the Fast Scan icon 525 can be a short cut to access the QR-code scanning camera. Alternatively, or additionally, external QR code scanners can be used to scan the QR codes generated by the web application 210 because the QR code embeds an encoded URL that includes all the details of the transaction.

Additionally, the QR-code used to activate a transaction contains the following information: user id, time stamp, and a hash of transaction generated after appending to these data a secret string known only to the server 105. As a result, if any of the information was altered in an attempt to inject false information in the system, the hash will not match and the transaction will be denied from the server 105. For example, in a peer to peer interaction, if one participant attempts to inject false information, the transaction will be denied. In this case, from the point of view of the system 100, the transaction never took place and no one is rewarded credits. In a one-to-many or group interaction, the malicious transaction will be denied and thus the malicious contribution will be ignored. However, in the one-to-many or group scenarios, all other valid contributions and the corresponding credits are not affected by this event.

Figure 6:
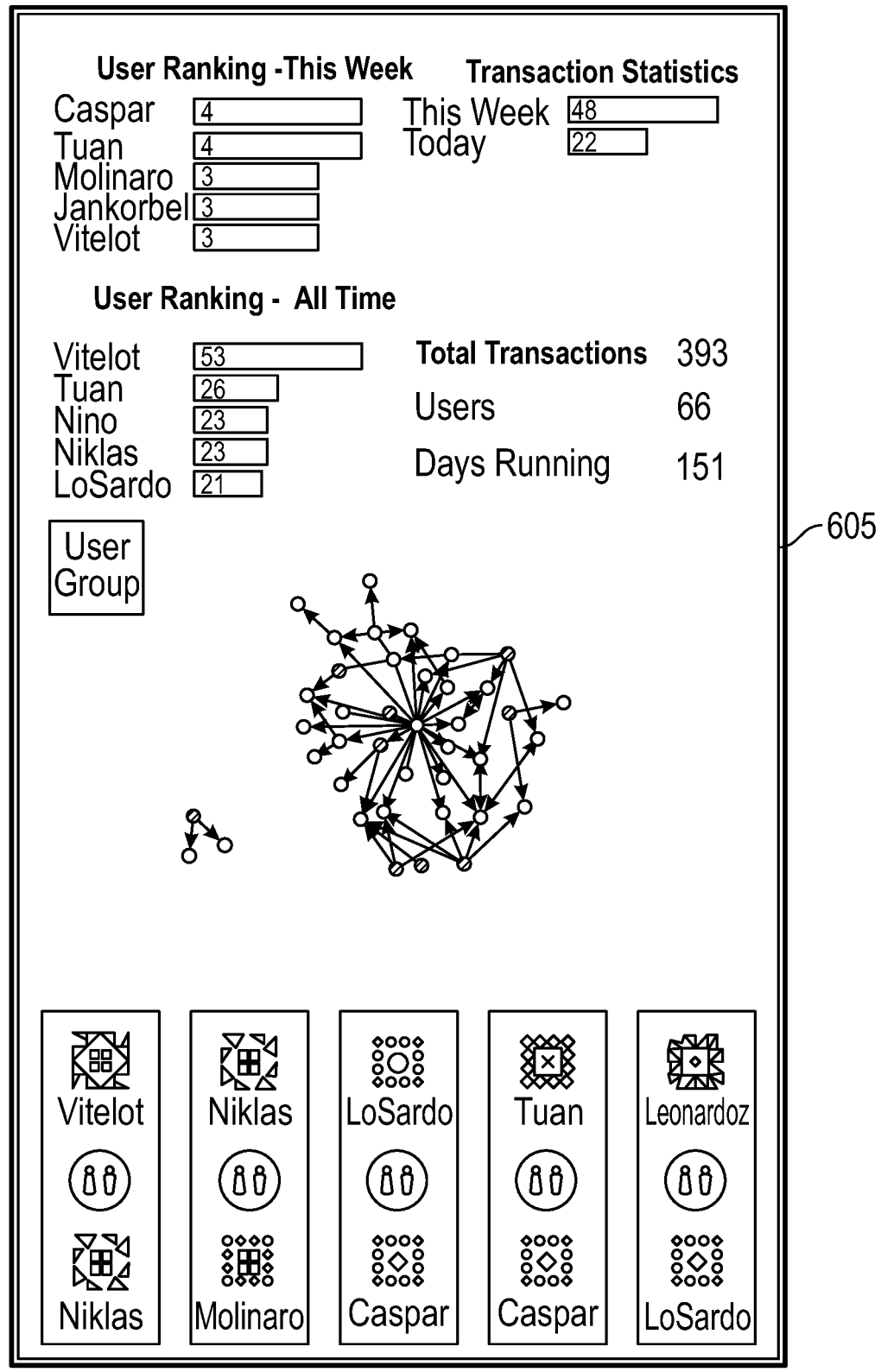
FIG. 6 illustrates an exemplary statistics interface of the web application according to one or more aspects of the disclosed subject matter.

FIG. 6 illustrates an exemplary statistics interface 605 of the web application 210 according to one or more aspects of the disclosed subject matter. The statistics interface 605 can include transaction statistics and corresponding rankings, for example. Additionally, the statistics interface 605 can include a datapoint cloud to illustrate the exchange of information between users.

Figure 7:
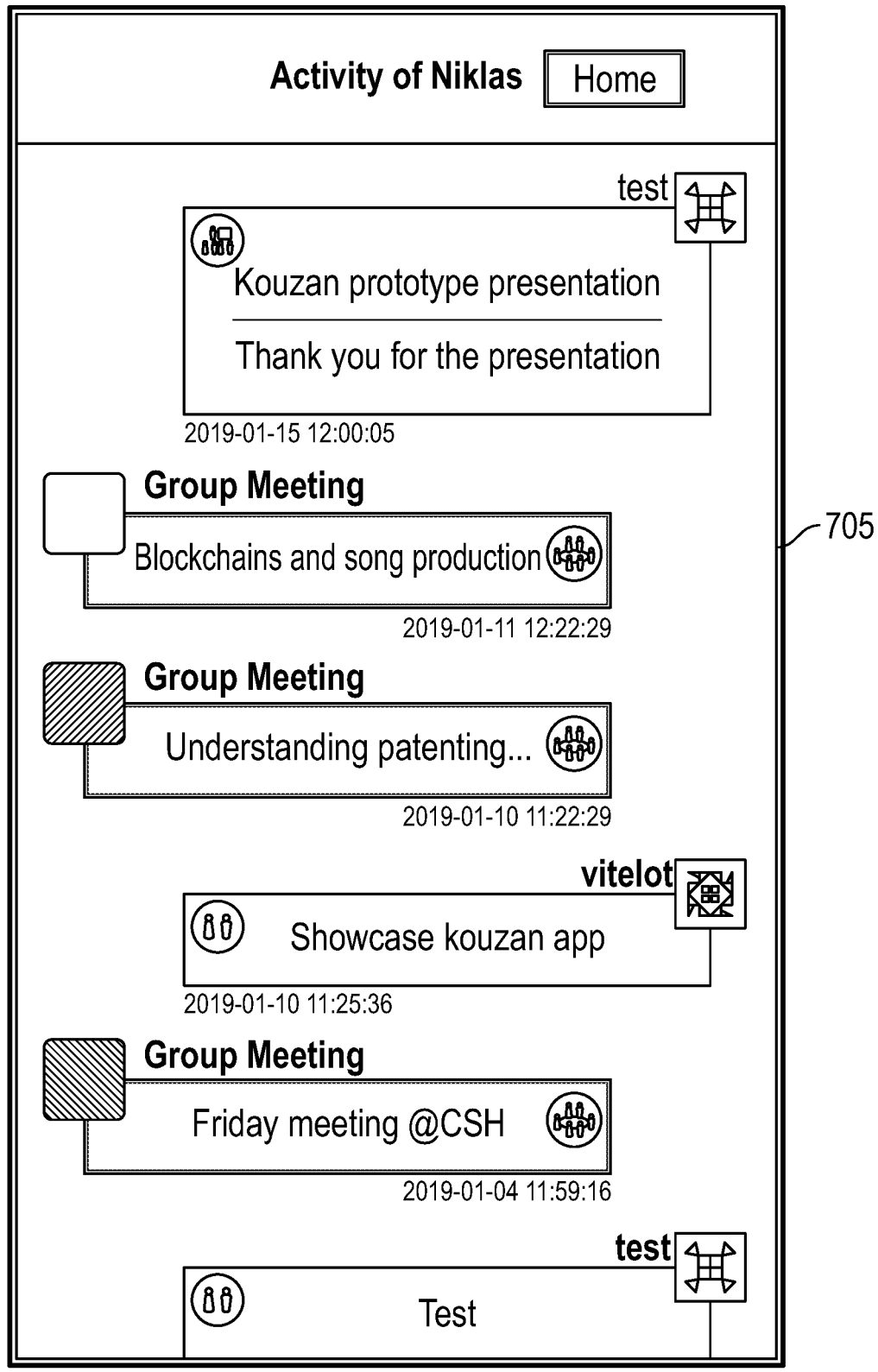
FIG. 7 illustrates an exemplary activity monitoring interface of the web application according to one or more aspects of the disclosed subject matter.

FIG. 7 illustrates an exemplary activity monitoring interface 705 of the web application 210 according to one or more aspects of the disclosed subject matter. The activity monitoring interface 705 can be a feed that lists various interactions where the web application 210 was used to track information exchanges, for example. The interactions listed in the activity monitoring interface 705 can include a timestamp.

FIG. 8 illustrates an exemplary co-creation process 800 according to one or more aspects of the disclosed subject matter. The co-creation process 800 includes a music creation software tool (e.g., development software 215). Additionally, the software includes a chat window. The system 100 can record all information corresponding to exchange 805 (e.g., contributions, communications, metadata (author, time), etc.) via the API 220, for example, and store the information in a conventional database (e.g., the database 120). In parallel, the hash of the information is added to the blockchain 115. It should be appreciated that the software tool and co-creation process are intended to be exemplary, and co-creation processes and software tools can vary throughout the modern creative industries including multimedia productions generally.

In other words, various development software 215 can be used with the system 100 to record the collective creative process by securing the full sequence of actions in a blockchain-based immutable ledger. Additionally, users can be guided in their creative exploits by letting them navigate in real-time the complex structure of contributions, recommend interesting chunks to be merged, noting ideas to be further developed, and identify new paths to be taken. Additionally, the system 100 can accompany creators through suitable AI assistants that will produce and propose suitable segments of music or text adapted to the specific needs. The system 100 can also allow users to act as supervisors by continuously evaluating the current status of the project, validating and rating the relevance of the different contributions, and merging and polishing portions of music or text and higher-order compounds. The system 100 can also give proper credits to all the relevant contributors according to their specific contributions to the final product. As described above, the credits attribution is based both on human contributions and on algorithms evaluating the full network structure that mirrors the co-creation process.

The system 100 has several advantageous applications. For example, blockchain-based applications like the system 100 can revolutionize the way in which textual content is created as the outcome of collaborative efforts. Traditional publications are frozen in their final version. They are clearly associated to one or more authors who get the credits of their work through the acknowledgement given by an external actor, i.e., a publishing house, a journal, etc. This process is leading to an extreme proliferation of publications, with the obvious drawback that relevant information is often difficult to retrieve, and the credits system can become highly biased and unfair. In addition, the creative potential of the community of writers is not fully leveraged. The possibility to rely on a distributed and immutable ledger like the blockchain 115 in the system 100 allows for liquid publications. A liquid publication is a fluid object that evolves through a continuous series of individual contributions leading to a complex system of variants.

The possibility of tracking and assessing individual contributions decouples the need of releasing the product from the process of giving credits. Credits, in fact, can be given based on actual contributions (as has been described herein), also independently of the final release of the product. Applications can range from liquid textbooks, liquid news reports, liquid creative compositions (e.g., interactive screenplays), and the like. The system 100 can be used for this application by having an effective platform for co-creation, AI facilitators suggesting content and collaborators, blockchains for the acknowledgement of credits, and suitably conceived credit schemes for users.

Another advantage of the system 100 is trustworthy credit schemes. For example, a key ingredient to the system 100 is contributors expressing their creativity can be represented by reliable schemes to assign credits in a trustworthy way. Once the whole creative process is tracked (e.g., who did what at what time and under what circumstances) and represented through complex topological structures (e.g., FIG. 3), a well-defined mathematical problem emerges of how to distribute the credits among all the contributors. For instance, in FIG. 4 the evolutionary line 405 that led to a final product release 410 represents the ensemble of contributions to the final product release and the credit assignment schemes will allow to redistribute the revenues in a fair way. The problem is made non-trivial by the need to assess the relative importance of very different contributions (e.g., an important change compared to an extensive polishing edit). The schemes will rely on a combination of human contributions (also collected and assessed through the blockchain) and state-of-the-art tools inspired to network theory and complexity science. The combination of trustworthy platforms and reliable credit schemes is crucial to revolutionize the creative industry.

Another advantage of the system 100 is optimizing organizational information flow. For example, many human activities rely on complex collective processes where the workload is subdivided in different tasks committed to different individuals. This process is often not easily parallelized, meaning that the different tasks cannot proceed independently. Very often instead, the efficiency of collective processes depends on a complex interplay among all the tasks. This generates a network of dependencies that implies that certain tasks cannot be completed unless other tasks are, and so on. For these reasons, work organization, i.e., the way that tasks are distributed amongst the individuals in an organization and the ways in which these are then coordinated to achieve the final product or service, it is not an easy task itself. Work organization may be determined by a number of factors including the composition of the working teams, the nature of the technology used to coordinate the tasks, the structure of the information flow, i.e., the way in which information is shared within and across working teams, managerial choices, bottom-up adjustments of tasks and their distribution within the teams, etc.

The system 100 can help in work organization through a thorough assessment of the information flows within complex collective processes. Knowing who is interacting with whom, for which task, at what time, and for how long, can identify bottlenecks and clogs in the process. In addition, a mapping of the complex structure of tasks and contributions given by individuals can determine the best way to form teams, making them more creative and engaged.

In other words, the system 100 is a framework that enables the tracking of knowledge transfers in all their forms. With the system 100 those things that are intangible, such as information, are made tangible and measurable. This information flow is recorded in an immutable and decentralized ledger, enabling users to easily access their records at any time to provide proof of and legitimize their contributions. This feature opens the possibility to a panoply of potential applications. The system 100 can, for example, track co-creation processes by leveraging platforms for liquid publications, or assess individual contributions to complex projects and distributing credits in a fair way. Moreover, the system 100 enables the mapping of knowledge flows in working groups like large institutions or corporations with many different working sectors. This new possibility to assess individual contributions in a trustworthy way in the complex network of knowledge transfers is significantly advantageous to allow people to express their creativity and their potential in their individual and collective activities because, using the system 100, contributors do not need to be concerned about a fair acknowledgement of their work. They can safely share their creations and access the content of others who have also shared theirs, enabling trouble-free collaborations. Reassured by a fair acknowledgement of their credits, possibly helped by personal AI assistants, creators can work on an immersive environment where their only concern will be that of expressing their talent.

Figure 9:
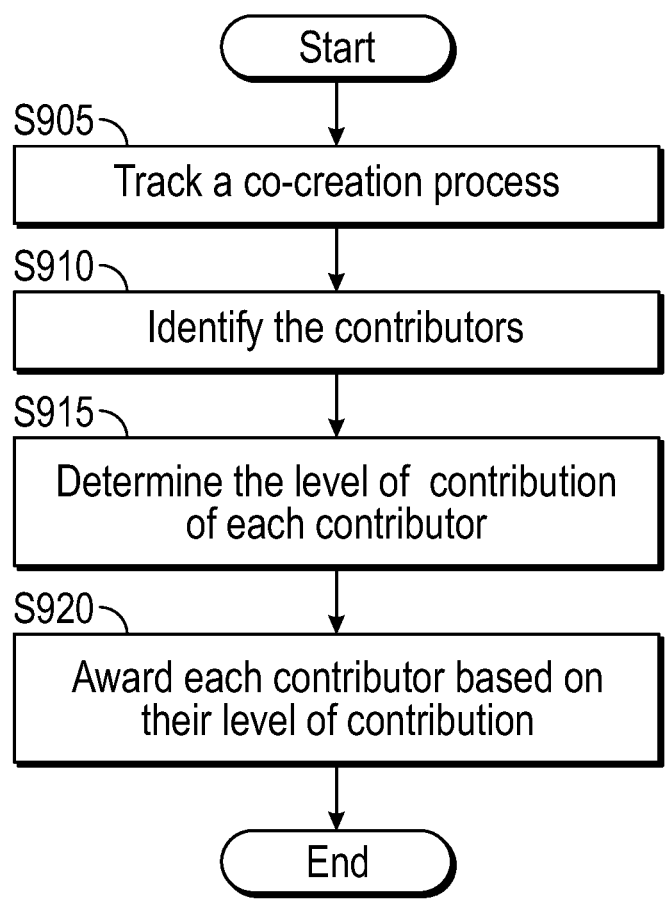
FIG. 9 is an algorithmic flow chart of a method for accurately tracking a co-creation process according to one or more aspects of the disclosed subject matter.

FIG. 9 is an algorithmic flow chart of a method for accurately tracking a co-creation process according to one or more aspects of the disclosed subject matter.

In S905, the server 105 can track an information exchange transaction. The information exchange transaction can be a co-creation process (e.g., the co-creation process 800), for example. Alternatively, or additionally, the information exchange transaction can be a one on one transaction, a lecture, a group project, and the like.

In S910, the server 105 can identify the contributors via each contributor's interaction with the system 100. For example, each interaction can include metadata which can include user IDs and other identifiable information regarding the information exchange transaction.

In S915, the server 105 can determine a level of contribution of each contributor (the level of contribution can be confirmed using the blockchain, thus securing the level of contribution from being manipulated maliciously, as further described herein). The information exchange transaction can be processed at any time to determine the level of contribution. The level of contribution can be determined through information tracked throughout the information exchange. In other words, based on information about the transactions, the level of contribution can be calculated. For example, each node in an evolutionary line that led to a final product is associated with a series of metadata illustrating the type of event responsible for that node, different IDs, the contributing user, the time stamp, the hash of the actual content represented by the node, and the like (e.g., see FIG. 4). Additionally, it should be appreciated that the timing for these events can depend on the use case. In one embodiment, the server 110 can calculate the level of contribution at the time of the transaction and then immediately issue a reward based on the result of the calculation. In one example, however, there can be some time between the transaction and the calculation of the level and contribution. For instance, in the case of co-creating music, contributions are calculated and rewards are distributed once a final product is released. In that case, the content of a transaction is added to the database and blockchain at the time of transaction and used at a later point for distributing rewards.

In S920, each contributor can be awarded based on their level of contribution determined in S915. In the system 100, the award can be K* coins, for example. However, even though K* may have value, the accurate determination of contribution can also be awarded in practical ways like royalty payouts in music industry, for example. In other words, the award can correspond to a payment of money/coins, an acknowledgment of contributions, a share in the resulting object (e.g., royalties for a song), and the like. This is advantageous as it fairly distributes credit in a trust worthy way as further described herein. After each contributor is accurately awarded, the process can end.

Figure 10:
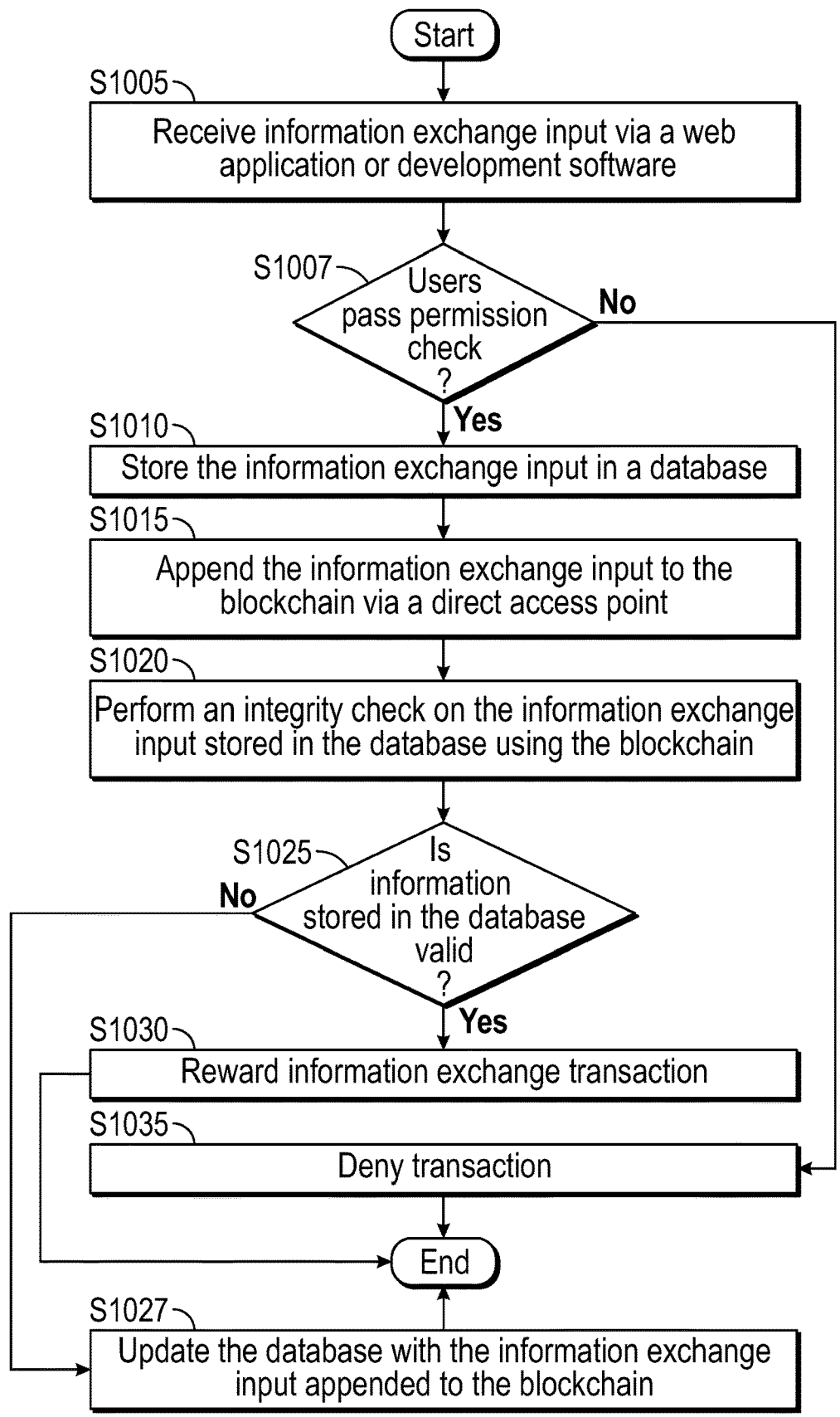
FIG. 10 is an algorithmic flow chart of a method for accurately rewarding an information exchange transaction according to one or more aspects of the disclosed subject matter.

FIG. 10 is an algorithmic flow chart of a method for accurately rewarding an information exchange transaction according to one or more aspects of the disclosed subject matter.

In S1005, the server 105 can receive information exchange input via the web application 210 or the development software 215. The information exchange input can correspond to contributions of users, for example.

In S1007, the server 105 can check permissions of the contributing users. For example, when two or more users want to add information to the database, a permissions check is performed to make sure that the users have the rights to add the information. In one example, this is accomplished with user accounts. The user is able to log into their account only when they know the password. Additionally, the user is only able to create a QR code for a transaction or scan someone else's QR code from their account. For example, user A and user B can add a transaction between A and B if they are logged into their accounts. However, they cannot create a fake transaction between user C and user D without having access to their accounts. If the contributing users clear the permissions check, a new transaction is added to the database. The permissions check can be done with cookies, for example. Accordingly, the transaction can be either accepted or denied based on user rights, timeframe, and the like. If the contributing users do not pass the permissions check, the transaction can be denied in S1035.

In S1010, the server 105 can store the information exchange input in a conventional database (e.g., the database 120).

In S1015, the information exchange input can be appended to the blockchain (e.g., the blockchain 115) via a direct access point (e.g., a digital wallet). The information exchange input can be appended to the blockchain 115 in parallel with the information exchange input being stored in the database 120 (S1010). For example, even if the database 120 in S1010 fails (e.g., due to server downtime), the information is still added to the blockchain 115.

In S1020, the server 105 can perform an integrity check on the information exchange input stored in the database 120 using the immutable distributed ledger of the blockchain 115. The integrity of the database 120 can be checked at any time by comparing it to the blockchain 115. If there is a mismatch for the database 120 and the blockchain 115, the transaction information in the database 120 can be replaced with the information from the blockchain 115 as it is assumed that the blockchain 115 has the correct information due to its immutability. In other words, the server 110 can access the data from the database 120 which can be compared to the data on the blockchain 115. Ideally, there should be a 1:1 match of the data. However, in the case of malicious manipulation to the database 120, there will be a mismatch. In such an event, the data stored on the blockchain 115 can be trusted as it is considered immutable. In this case, the manipulated data in the database 120 can be replaced with the data stored on the blockchain 120. To limit the amount of data stored in the less efficient blockchain 115, the hashes of the data can be stored instead of the data itself, for example. By comparing the hashes, the same integrity check can be performed. Accordingly, the blockchain 115 is useful to guarantee that the data in the database 120 was not manipulated after it was initially added to the database 120. Additionally, in one embodiment, the reward (K*) can be sent immediately after appending the transaction information to the database+blockchain. In this case, the user receiving the information can reward the sender of information with a coin (K*). This reward may not be based on the other transactions stored in the database/blockchain. The information in the database can then at a later point be used to calculate a different type of "award" like a reputation rating and transaction statistics, for example. In another embodiment (e.g. a collaborative music platform), the distribution of rewards may not be triggered by the transaction. In that case, transactions can be checked for permission and added to the database/blockchain or are denied. Then, at any point in time, there might be an event such as the release of a song that can trigger the calculation and distribution of the contributions based on the database which is secured by the blockchain.

In S1025, it can be determined if the information stored in the database 120 is valid based on the integrity check performed in S1020. If the integrity check is valid, the server 105 can reward the information exchange transaction in S1030, and then the process can end. However, if the information stored in the database is not valid (e.g., the hashes do not match because someone tried to maliciously manipulate the data), the database 120 can be updated with the information exchange information appended to the blockchain in S1027, and then the process can end.

In S1030, the server 105 can reward (e.g., provide an award to the user) the information exchange transaction when the information stored in the database 120 is valid (although the timing on distributing the award/reward can vary as further described herein). In other words, as long as a user has not tried to manipulate the system 100 to receive an unfair amount of credit for a contribution, the information exchange transaction can be rewarded fairly. Additionally, it should be appreciated that for distributing rewards, both the permissions check (S1007) and the integrity check (S1020) are important as the credit scheme must be based on valid data. Accordingly, the data must have been valid when it was added (i.e. the users who added it had the permission to do so) and it must not have been manipulated (i.e. the database 120 must match the blockchain 115.) Further, it should be appreciated that rewarding the information exchanging transaction can include providing an award (e.g., payment of money/coins, an acknowledgement of contributions, a share in the resulting object, and the like as further described herein).

In S1035, the server 105 can deny a transaction when the information stored in the database 120 is not valid based on the integrity check. In other words, if any of the information was altered in an attempt to inject false information in the system 100, the hash will not match and the transaction will be denied from the server 105. After either S1030 or S1035, the process can end.

Figure 11:
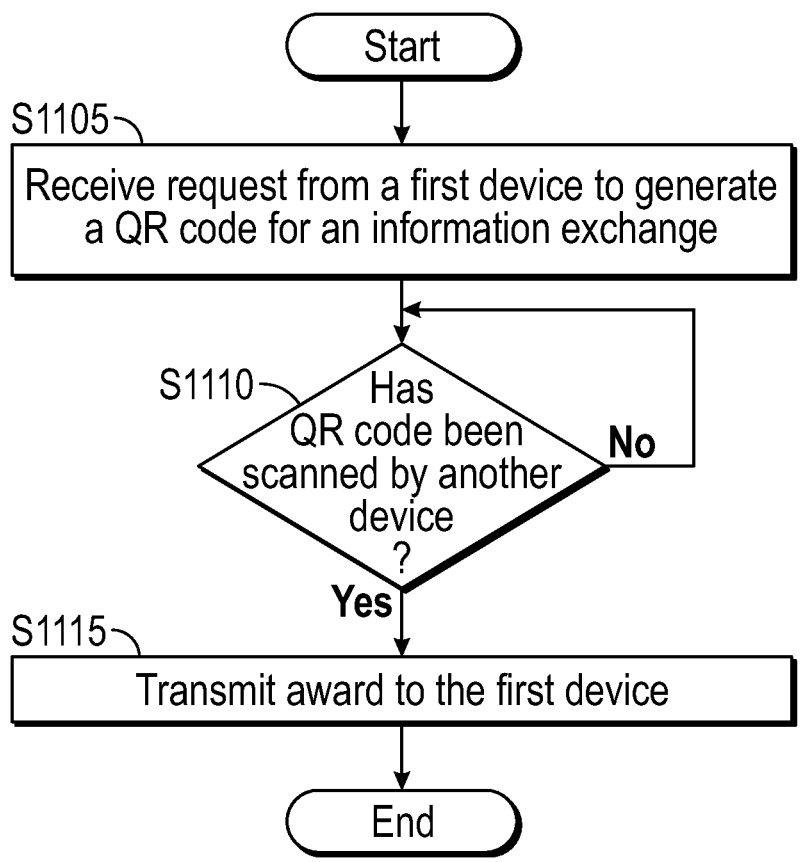
FIG. 11 is an algorithmic flow chart of a method for distributing rewards for an information exchange transaction according to one or more aspects of the disclosed subject matter.

FIG. 11 is an algorithmic flow chart of a method for distributing rewards for an information exchange transaction according to one or more aspects of the disclosed subject matter.

In S1105, the server 105 can receive a request from a first device (e.g., a first remote device 110) to generate a QR code for an information exchange. The QR code for the information exchange can include various information regarding the information exchange including the type of exchange and the content of the exchange. The request to generate the QR code can also include a time frame. For example, if the QR code was generated for a lecture or a group project, the QR code may have an expiration time to prevent users from scanning the QR code without having actually attended the lecture or contributed to the group project.

In S1110, it can be determined if the QR code has been scanned by another device (e.g., one or more other remote devices 110). The QR code can be scanned by one or more devices depending on the type of transaction. For example, in a one on one transaction, the server 105 can be prepared for one scan. Alternatively, in a lecture or group transaction, the QR code may be scanned more than one time. If it is determined that the QR code has not been scanned, the process can continue checking whether or not the QR code has been scanned. In one example, the process can continue checking until the QR times out (e.g., based on the predetermined expiration time). If it is determined that the QR code has been scanned by another device or a plurality of other devices, the server 105 can transmit an award to the first device in S1115.

In S1115, the server 105 can transmit an award to the first device that generated the QR code that verifies the first device user's contribution to the information exchange transaction. Additionally, it should be appreciated that the award does not have to only go in one direction. For example, in a group project or co-creation process, the award can be distributed fairly according to the level of contribution of each contributor. After the award is transmitted to the first device, the process can end. Additionally, the QR codes are exemplary and are not intended to be limiting. For example, in one embodiment, a coworking platform may automatically send all contributions associated with a user account to the server 105/blockchain 115, and thus may not require QR codes. Alternatively, or additionally, the system can use any unique code that can be identified by another user device, for example.

Additionally, it should be appreciated that, in one embodiment, information about the transaction can also be added by the person scanning the QR code. For example, user A has a discussion with user B and gives user B valuable information. Now, they want to record their interaction. User A will receive credits for the interaction, therefore he wants to create a QR code. He asks the server for a QR code, specifying the type of interaction (e.g., discussion) and the expiration time. User A gets a QR code including a timestamp, the user name of user A, the type of transaction, and a hash that is generated based on this information plus a secret string that is not known to any user. The server can save the timeframe for this QR code. User B wants to give credits to user A, so user B scans the QR code. User B sends the information from the QR code to the server. The server can check if the present time is within the specified timeframe, or otherwise it will reject the transaction. Further, the server will hash the information provided by user B using the secret string that is only known to the server. If the result of the hash-function matches the hash provided by user B, the information is validated. If user B changed any of the information, there will be a mismatch of hashes and the transaction will be rejected. If the transaction is validated, user B will be offered to add further information to the transaction in the form of a comment. The comment can ideally include a description of the interaction. User B sends the comment to the server, and this concludes the process.

Additionally, in a one-to-many interaction (e.g., a lecture), the process may not end after the QR code was scanned by one device. Instead, it can end once the expiration time of the QR code is passed because the QR code might get scanned by other devices within the predetermined time frame. For a group interaction, every participate is rewarded once, and the process also ends after the expiration time is reached.

Further, it should be appreciated that the reward may not be triggered by the transaction. Alternatively, or additionally, the reward may be triggered by a later event and it can get triggered more than once (e.g. if a contribution to a song is used in a second song, money can be distributed upon release of each song).

In the above description of FIGS. 2, 9, 10, and 11, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 12:
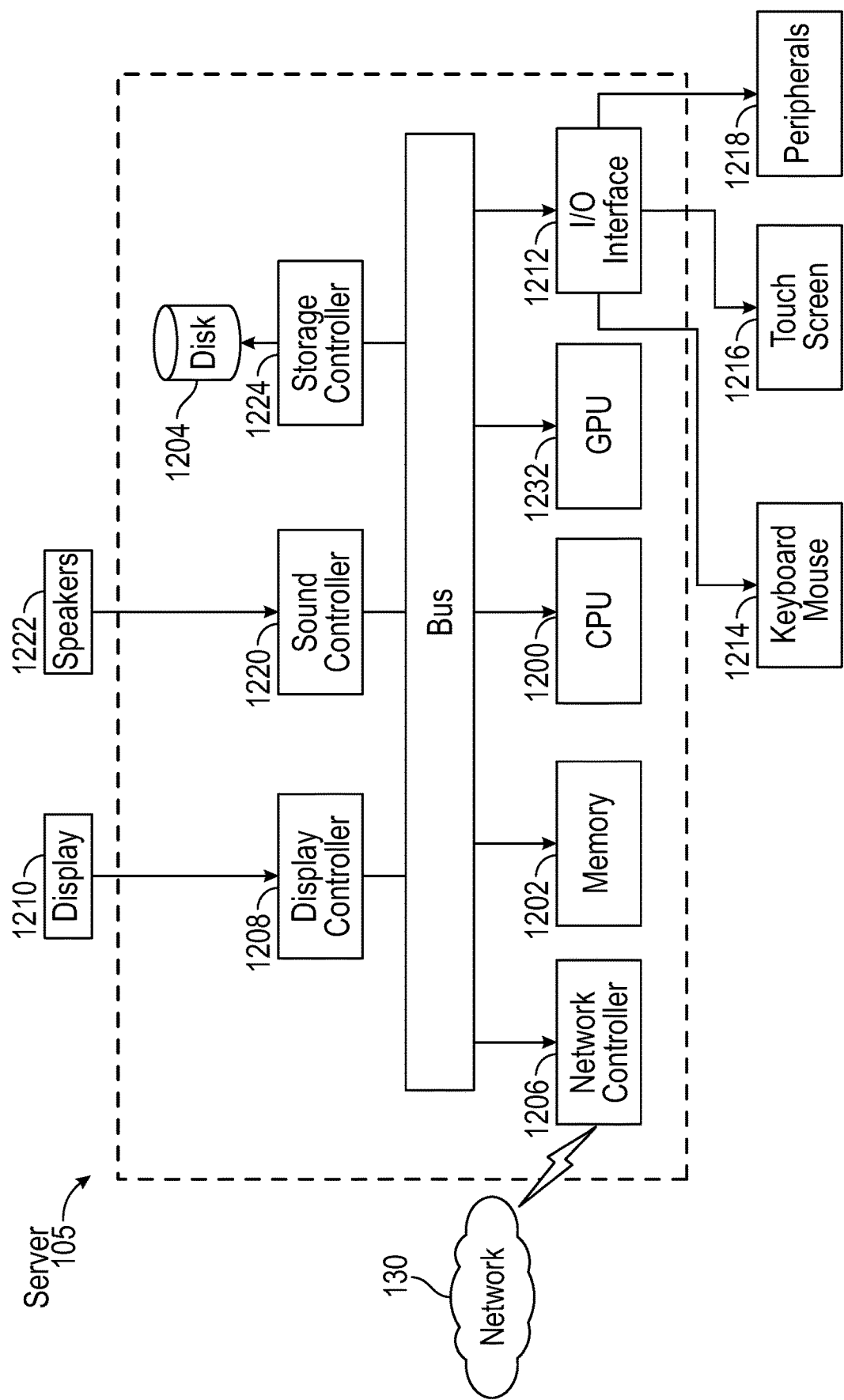
FIG. 12 illustrates a hardware block diagram of a server according to one or more exemplary aspects of the disclosed subject matter.

Next, a hardware description of a server (such as the server 105) according to exemplary embodiments is described with reference to FIG. 12. The hardware description described herein can also be a hardware description of the processing circuitry. In FIG. 12, the server 105 includes a CPU 1200 which performs one or more of the processes described herein. Additionally, either individually or in combination with the CPU 1200, a GPU 1232 can perform one or more of the processes described herein. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 105 communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the server 105 may be realized by various circuitry elements. Further, each of the functions of the above described embodiments may be implemented by circuitry, which includes one or more processing circuits. A processing circuit includes a particularly programmed processor, for example, processor (CPU) 1200, as shown in FIG. 12. A processing circuit also includes devices such as an application specific integrated circuit (ASIC) and conventional circuit components arranged to perform the recited functions.

In FIG. 12, the server 105 includes a CPU 1200 which performs the processes described above. Additionally, the GPU 1232 can perform or assist in performing the processes described herein. The GPU 1232 can be specialized electronic circuit designed to rapidly manipulate and alter memory. The highly parallel structure of a GPU makes them efficient for algorithms that process large blocks of data in parallel. The GPU can be present on a video card, embedded on a motherboard, or embedded in a CPU, for example. The server 105 may be a general-purpose computer or a particular, special-purpose machine. In one embodiment, the server 105 becomes a particular, special-purpose machine when the processor 1200 and/or the GPU 1232 is programmed to track and reward information exchange transactions (and in particular, any of the processes discussed with reference to FIGS. 2, 9, 10, and 11).

Alternatively, or additionally, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The server 105 in FIG. 12 also includes a network controller 1206, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 105 further includes a display controller 1208, such as a graphics card or graphics adaptor for interfacing with display 1210, such as a monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners.

A sound controller 1220 is also provided in the server 105 to interface with speakers/microphone 1222 thereby providing sounds and/or music.

The general-purpose storage controller 1224 connects the storage medium disk 1204 with communication bus 1226, which may be an ISA, EISA, VESA, PCI, or similar, for interconnecting all of the components of the server 105. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Further, in one embodiment, the server 105 can be implemented in a cloud-based computing system and/or represent the virtualized hardware in a serverless environment programmed to track and reward information exchange transactions (and in particular, any of the processes of the system 100 discussed with reference to FIGS. 2, 9, 10, and 11). More specifically, the processing may be performed using a serverless architecture for scalability. For example, cloud computing aggregates physical and virtual computation, storage, and network resources in the "cloud." Serverless computing offers a high level of computational abstraction, with increased scalability. Serverless computing works by uploading code to a serverless computing environment (or serverless computing platform or serverless environment), and the serverless computing environment executes the code. Additionally, the serverless computing environment can be event driven, meaning that the code can execute or perform computations triggered by events. In some cases, the code can be executed on demand, or according to a predetermined schedule. In a serverless computing environment, the user is abstracted from the setup and execution of the code in the networked hardware resources in the cloud. In some cases, the serverless computing environments are virtualized computing environments having an application programming interface (API) (e.g., the API 220) which abstracts the user from the implementation and configuration of a service or application in the cloud.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A server, comprising:
processing circuitry configured to
track an information exchange transaction,
identify contributors in the information exchange transaction,
determine a level of contribution of each contributor, the level of contribution being secured by a blockchain,
wherein the circuitry for determining the level of contribution of each contributor is further configured to
determine the level of contribution based on information tracked throughout the information exchange, wherein the information exchange includes a plurality of nodes including one or more of a creation node, a fork edit node, a merge request node, an accepted merge node, a merge node, and a release node in an evolutionary line that led to a final product, wherein each node is associated with a series of metadata illustrating a type of event responsible for that node, different IDs, a contributing user, a time stamp, and a hash of content represented by the node,
perform, using the blockchain, an integrity check on an information exchange input stored in a database by comparing the database to the blockchain,
determine if the information exchange input stored in the database is valid based on a match between the database and the blockchain,
reward the information exchange transaction in response to a determination that the information exchange input stored in the database is valid, and
update the database with the information exchange input stored in the blockchain in response to a determination that the information exchange input stored in the database is invalid based on a mismatch between the database and the blockchain, and
award each contributor based on their level of contribution, wherein the award includes
a user receiving information rewarding a sender of the information, wherein the reward is not based on other transactions stored in the database and on the blockchain, wherein the reward is sent immediately after appending the transaction information to the database and blockchain, and
in response to a predetermined event corresponding to a final product release, calculation and distribution of contributions based on the database secured by the blockchain,
wherein contributions from each individual participant participating in the information exchange transaction are stored in the database and appended to the blockchain in parallel such that the blockchain guarantees an integrity of the contributions from each individual participant and the database is used for access and analytics,
wherein the processing circuitry for tracking an information exchange transaction is further configured to track a co-creation process using a co-creation platform provided by the server, wherein the co-creation process includes writing a liquid publication, wherein the liquid publication is a fluid object that evolves through a continuous series of individual contributions.

2. The server of claim 1, wherein the processing circuitry for determining the level of contribution of each contributor is further configured to
receive the information exchange input via an application or development software,
check user permissions,
store the information exchange input in the database in response to a determination that the information exchange input was received with permission, and
append the information exchange input to the blockchain via a direct access point.

3. The server of claim 2, where in the processing circuitry is further configured to
deny the information exchange transaction in response to a determination that the contributors did not pass a permissions check.

4. The server of claim 2, wherein the direct access point is a digital wallet.

5. The server of claim 2, wherein the processing circuitry for rewarding the information exchange transaction is further configured to
receive a request from a first device to generate a QR code for the information exchange transaction,
determine whether the QR code has been scanned by another device, and
transmit an award to the first device in response to a determination that the QR code was scanned by another device or a plurality of other devices.

6. The server of claim 5, wherein the QR code for the information exchange transaction includes metadata including a type of information exchange transaction and at least a portion of content of the information exchange transaction.

7. The server of claim 5, wherein the type of information exchange transaction includes a one to one transaction, a one to many transaction, a many to many transaction, and ongoing collaboration.

8. A method of accurately rewarding an information exchange transaction, comprising:
tracking the information exchange transaction;
identifying contributors in the information exchange transaction;
determining a level of contribution of each contributor, the level of contribution being secured by a blockchain, wherein determining the level of contribution of each contributor includes
determining the level of contribution based on information tracked throughout the information exchange, wherein the information exchange includes a plurality of nodes including one or more of a creation node, a fork edit node, a merge request node, an accepted merge node, a merge node, and a release node in an evolutionary line that led to a final product, wherein each node is associated with a series of metadata illustrating a type of event responsible for that node, different IDs, a contributing user, a time stamp, and a hash of content represented by the node;

performing, using the blockchain, an integrity check on an information exchange input stored in a database by comparing the database to the blockchain;

determining if the information exchange input stored in the database is valid based on a match between the database and the blockchain;

rewarding the information exchange transaction in response to a determination that the information exchange input stored in the database is valid;

updating the database with the information exchange input stored in the blockchain in response to a determination that the information exchange input stored in the database is invalid based on a mismatch between the database and the blockchain;

awarding each contributor based on their level of contribution, wherein the award includes a user receiving information rewarding a sender of the information, wherein the reward is not based on other transactions stored in the database and on the blockchain, wherein the reward is sent immediately after appending the transaction information to the database and blockchain, and in response to a predetermined event corresponding to a final product release, calculation and distribution of contributions based on the database secured by the blockchain; and wherein tracking the information exchange transaction includes tracking a co-creation process using a co-creation platform provided by the server, wherein the co-creation process includes writing a liquid publication, wherein the liquid publication is a fluid object that evolves through a continuous series of individual contributions, wherein contributions from each individual participant participating in the information exchange transaction are stored in the database and appended to the blockchain in parallel such that the blockchain guarantees an integrity of the contributions from each individual participant and the database is used for access and analytics.

9. The method of claim 8, wherein determining the level of contribution of each contributor further comprises:

receiving the information exchange input via an application or development software;

checking user permissions;

storing the information exchange input in the database in response to a determination that the information exchange input was received with permission; and appending the information exchange input to the blockchain via a direct access point.

10. The method of claim 9, further comprising:

denying the information exchange transaction in response to a determination that the contributors did not pass a permissions check.

11. The method of claim 9, wherein the direct access point is a digital wallet.

12. The method of claim 9, wherein rewarding the information exchange transaction further comprises:

receiving a request from a first device to generate a QR code for the information exchange transaction;

determining whether the QR code has been scanned by another device; and transmitting an award to the first device in response to a determination that the QR code was scanned by another device or a plurality of other devices.

13. The method of claim 12, wherein the QR code for the information exchange transaction includes metadata including a type of information exchange transaction and at least a portion of content of the information exchange transaction.

14. The method of claim 12, wherein the type of information exchange transaction includes a one to one transaction, a one to many transaction, a many to many transaction, and ongoing collaboration.

15. A non-transitory computer-readable storage medium storing computer-readable instructions thereon which, when executed by a computer, cause the computer to perform a method, the method comprising:

tracking an information exchange transaction;

identifying contributors in the information exchange transaction;

determining a level of contribution of each contributor, the level of contribution being secured by a blockchain, wherein determining the level of contribution of each contributor includes determining the level of contribution based on information tracked throughout the information exchange, wherein the information exchange includes a plurality of nodes including one or more of a creation node, a fork edit node, a merge request node, an accepted merge node, a merge node, and a release node in an evolutionary line that led to a final product, wherein each node is associated with a series of metadata illustrating a type of event responsible for that node, different IDs, a contributing user, a time stamp, and a hash of content represented by the node, performing, using the blockchain, an integrity check on an information exchange input stored in a database by comparing the database to the blockchain;

determining if the information exchange input stored in the database is valid based on a match between the database and the blockchain;

rewarding the information exchange transaction in response to a determination that the information exchange input stored in the database is valid;

updating the database with the information exchange input stored in the blockchain in response to a determination that the information exchange input stored in the database is invalid based on a mismatch between the database and the blockchain;

awarding each contributor based on their level of contribution, wherein the award includes a user receiving information rewarding a sender of the information, wherein the reward is not based on other transactions stored in the database and on the blockchain, wherein the reward is sent immediately after appending the transaction information to the database and blockchain, and in response to a predetermined event corresponding to a final product release, calculation and distribution of contributions based on the database secured by the blockchain, wherein contributions from each individual participant participating in the information exchange transaction are stored in the database and appended to the blockchain in parallel such that the blockchain guarantees an integrity of the contributions from each individual participant and the database is used for access and analytics; and wherein tracking the information exchange transaction includes tracking a co-creation process using a co-creation platform provided by the server, wherein the co-creation process includes writing a liquid publication, wherein the liquid publication is a fluid object that evolves through a continuous series of individual contributions.

16. The non-transitory computer-readable storage medium of claim 15, wherein determining the level of contribution of each contributor further comprises:

receiving the information exchange input via an application or development software;

checking user permissions;

storing the information exchange input in the database in response to a determination that the information exchange input was received with permission; and appending the information exchange input to the blockchain via a direct access point.

17. The non-transitory computer-readable storage medium of claim 16, further comprising:

denying the information exchange transaction in response to a determination that contributors did not pass a permissions check.

18. The non-transitory computer-readable storage medium of claim 16, wherein rewarding the information exchange transaction further comprises:

receiving a request from a first device to generate a QR code for the information exchange transaction;

determining whether the QR code has been scanned by another device; and transmitting an award to the first device in response to a determination that the QR code was scanned by another device or a plurality of other devices.

* * * * *